(12) United States Patent
Siegel

(10) Patent No.: US 8,683,200 B2
(45) Date of Patent: *Mar. 25, 2014

(54) METHOD AND APPARATUS FOR IMPLEMENTING DIGITAL RIGHTS MANAGEMENT

(75) Inventor: Jaime A. Siegel, Woodcliff Lake, NJ (US)

(73) Assignees: Sony Corporation, Tokyo (JP); Sony Corporation of America, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/948,059

(22) Filed: Nov. 17, 2010

(65) Prior Publication Data

US 2011/0061107 A1    Mar. 10, 2011

Related U.S. Application Data

(63) Continuation of application No. 10/402,035, filed on Mar. 28, 2003, now Pat. No. 7,845,014.

(51) Int. Cl.
*H04L 12/22* (2006.01)
*H04L 9/12* (2006.01)

(52) U.S. Cl.
USPC .......................................... 713/167; 713/165

(58) Field of Classification Search
None
See application file for complete search history.

(56) References Cited

U.S. PATENT DOCUMENTS

| | | | |
|---|---|---|---|
| 4,473,906 A | 9/1984 | Warnaka et al. | |
| 5,386,479 A | 1/1995 | Hersh | |
| 5,920,861 A | 7/1999 | Hall et al. | |
| 5,943,422 A | 8/1999 | Van Wie et al. | |
| 6,009,525 A | 12/1999 | Horstmann | |
| 6,151,634 A | 11/2000 | Glaser et al. | |
| 6,189,097 B1 | 2/2001 | Tycksen et al. | |
| 6,272,636 B1 | 8/2001 | Neville et al. | |
| 6,314,466 B1 | 11/2001 | Agarwal et al. | |
| 6,330,670 B1 | 12/2001 | England et al. | |
| 6,330,675 B1 | 12/2001 | Wiser et al. | |
| 6,345,100 B1 | 2/2002 | Levine | |
| 6,385,596 B1 * | 5/2002 | Wiser et al. | 705/51 |
| 7,171,558 B1 * | 1/2007 | Mourad et al. | 713/168 |
| 2002/0114466 A1 | 8/2002 | Tanaka et al. | |
| 2002/0157002 A1 | 10/2002 | Messerges et al. | |
| 2002/0194492 A1 | 12/2002 | Choi et al. | |

(Continued)

OTHER PUBLICATIONS

XrML. Wang et al. ACM Workshop on XML Security. Nov. 22, 2002.*

(Continued)

*Primary Examiner* — Venkat Perungavoor
(74) *Attorney, Agent, or Firm* — Kevin L. Williams; Mayer & Williams PC

(57) ABSTRACT

A content server is provided for storing and distributing digital content to a client. The content server includes a content database configured to electronically store the digital content and a DRM packager for adding a universal DRM layer to the digital content stored at the content database. The universal DRM layer is able to access digital content in conformance with a plurality of different DRM implementations, the digital content being in conformance with one of the plurality of different DRM implementations. The universal DRM layer can access the content by a variety of means, such as with a universal key, for example, that can decrypt content from many different DRM technologies. In this way the client only needs to have a DRM controller that is compatible with this higher-level, universal DRM implementation rather than with the individual, underlying DRM implementations.

20 Claims, 2 Drawing Sheets

(56) References Cited

U.S. PATENT DOCUMENTS

| | | |
|---|---|---|
| 2003/0078891 A1* | 4/2003 | Capitant .................... 705/57 |
| 2003/0103528 A1* | 6/2003 | Kawaguchi et al. .......... 370/468 |
| 2003/0126086 A1* | 7/2003 | Safadi ...................... 705/51 |
| 2003/0194093 A1* | 10/2003 | Evans et al. ............... 380/282 |
| 2003/0217011 A1 | 11/2003 | Peinado et al. |
| 2004/0049694 A1* | 3/2004 | Candelore .................. 713/200 |

OTHER PUBLICATIONS

DRM Article. http://www.giantstepsmts.com/drmarticle. Adapted from: Digital Rights Managment: Technology and Solutions, Second Annual University Summer Publishing Institute for Professionals, Charlottesville, VA, Jun. 2000.

Bill Rosenblatt, "Enterprise Content Integration with the Digital Object Identifier, a Business Case for Information Publishers." GiantSteps Media Technology Strategies, 2002. http://www.giantstepsmts.com.

Roger Clarke et al., "Technological Protections for Digital Copyright Objects." Presented to the Media Track of the ECIS 2000 Conference, Vienna, Jul. 3-5, 2000, and appears in Proc. 8th Euro. Conf. Infor. Sys. (ECIS'2000), Jul. 2000, Vienna Univ. of Economics & Business Administration at pp. 745-752. http://www.anu.edu.au/people/Roger.Clarke/II/TPDCO.html.

Andrew Orlowsji, "The Microsoft Secure PC: MA Patents A Lock-Down OS," http://www.theregister.co.uk/content/2/15620.html, posted Dec. 20, 2000.

Andrew Orlowsji, "The Microsoft Secure PC: MA Patents A Lock-Down OS," http://www.theregister.co.uk/content/archive/23387.html, posted Dec. 13, 2001.

Adam Souzis et al., "Getting Started with Web Syndication," ICE Implementation Cookbook, Information and Content Exchange. Book Version 1.0 Nov. 28, IDEAlliance, 2000. www.IDEAlliance.org.

The DOI Handbook, Version 2.4.0 Sep. 2002. International DOI Foundation, Inc., P.O. Box 233, Kidlington, Oxford OX5 1XU, United Kingdom. www.doi.org.

XrML 2.0 technical Overview, Version 1.0, Mar. 8, 2002. ContentGuard Holdings, Inc.

Electronic Privacy Information Center: Digital Rights Management and Privacy, http://www.epic.org/privacy/drm/; accessed Oct. 9, 2002.

Digital Rights Management (DRM) Architectures, D-Lib Magazine, www.dlib.org/dlib/june01/ianella/06ianella/.html; Jun. 6, 2001.

* cited by examiner

METHOD AND APPARATUS FOR IMPLEMENTING DIGITAL RIGHTS MANAGEMENT

STATEMENT OF RELATED APPLICATION

This application is a continuation of U.S. patent application Ser. No. 10/402,035, filed Mar. 28, 2003, now matured to a patent, U.S. Pat. 7,845,014, which is incorporated herein by reference in its entirety.

FIELD OF THE INVENTION

The present invention relates generally to the management of digital information, and more particularly to a method and apparatus for providing and accessing digital information protected by different digital rights management technologies.

BACKGROUND OF THE INVENTION

Computers store, share and manipulate digital information that can be replicated accurately and shared widely among many computer systems. Computers share or receive digital information in a variety of contexts. For example, digital information can be stored, exchanged and delivered by way of magnetic (floppy diskette) or optical (CD-ROM) storage devices. Computers operating in network environments pass digital information back and forth freely and often in great volume. In fact, more and more content is being delivered in digital form, and more and more digital content is being delivered online over private and public networks, such as Intranets, the Internet and cable TV networks. Wide-spread replication and distribution of digital products supports new methods of digital product manufacturing and distribution. That is, digitally stored items can be copied and distributed electronically outside the traditional methods of product manufacture and distribution.

For a user or client, a digital format allows more sophisticated content, while online delivery improves timeliness and convenience. For a publisher, digital content also reduces delivery costs. Unfortunately, these worthwhile attributes are often outweighed in the minds of publishers by the corresponding disadvantage that online information delivery makes it relatively easy to obtain pristine digital content and to pirate the content at the expense and harm of the publisher. Accordingly, the digital nature of these works, makes it imperative that they be secured against unauthorized copying. With no generation loss and the relative ease with which digital files may be copied and distributed, even a single unprotected copy could spawn a multitude of pirated versions, significantly reducing the demand for authorized copies.

If digital content such as digitized audio tracks, literary works in digital form, or digital images and videos could be securely distributed to consumers, then an entirely new market for these works could be created. For example, rather than purchasing music albums from a local retail outlet, consumers could download the digital data across the Internet and then write this data to their local CD-R, thus creating their own compact disks. Similarly, rather than renting a video tape from a local video retailer, consumers could download the digital version and then play it locally on their computer screens or televisions.

To address this need, Digital Rights Management (DRM) systems have recently been developed to restrict the use of digital files in order to protect the interests of content providers. DRM technologies can control file access (number of views, length of views), as well as the ability to alter, share, copy, print, and save files. These technologies may be contained within the operating system, program software, or in the actual hardware of a device. DRM systems may also be referred to as "Content Management Systems" (CMS), "Content/Copy Protection for Removable Media" (CPRM) or sometimes as "technological measures."

DRM systems generally use two approaches to securing digital content. The first is containment, in which the content is encrypted so that it can only be accessed by authorized users. The second is marking, in which a watermark or other tag is placed on the digital content as a signal to a user-device that the content is copy-protected. DRM technologies may use one or both of these approaches. In addition to security technology, DRM systems often include technology for packaging, distributing and rendering (e.g., displaying, playing and printing) the digital content.

While DRM standardization is now being pursued by a number of organizations such as the openEBook Forum, the MPEG group, the Internet engineering Task Force and the World Wide Web Consortium, currently there is not a core DRM technology that is widely deployed. Rather, it has been necessary to build end-to-end DRM solutions around component technologies, which make the components not very interoperable. For example, it is generally not possible to take Vendor A's encryption-based packaging technology and integrate it with Vendor B's rendering application.

SUMMARY OF THE INVENTION

In accordance with the present invention, a method and apparatus is provided for providing digital content to a client. The method begins by receiving a request from the client to receive digital content. The client is authorized to receive the digital content and the DRM implementation employed by the client is determined. The digital content is then provided to the client in conformance with the DRM implementation employed by the client.

In accordance with one aspect of the invention, the step of providing the digital content includes the step of transmitting the digital content to the client over a computer network. The computer network may be the Internet, for example.

In accordance with another aspect of the invention, the step of providing the digital content includes the step of providing a physical medium to the client in which the digital content is embodied.

In accordance with another aspect of the invention, the digital content is obtained from a content provider prior to transmitting the digital content to the client.

In accordance with another aspect of the invention, a rights package is bundled with the digital content prior to transmitting the digital content to the client.

In accordance with another aspect of the invention, the rights package includes a decryption key for decrypting the digital content.

In accordance with another aspect of the invention, the digital content includes text-based information, audio information, visual information, or any combination thereof.

In accordance with another aspect of the invention, the digital content is transmitted as streaming media.

In accordance with another aspect of the invention, a method is provided for receiving digital content from a content distributor. The method begins by transmitting a request to the content distributor to receive digital content. In addition, information is transmitted that reflects a DRM implementation in which the digital content is to be received. The digital content is received in conformance with the DRM implementation in which the digital content is to be received.

In accordance with another aspect of the invention, a DRM architecture is provided for storing and distributing digital content. The DRM architecture includes a content database for electronically storing the digital content and a DRM packager for distributing to a client the digital content in conformance with a plurality of different DRM implementations.

In accordance with another aspect of the invention, a method is provided for providing digital content to a client. The method begins by receiving a request from the client to receive digital content. The client is authorized to receive the digital content. A universal DRM layer is added to the digital content. The universal DRM layer is able to access digital content in conformance with a plurality of different DRM implementations. The digital content is in conformance with one of the plurality of different DRM implementations. The digital content is provided to the client in conformance with the universal DRM layer.

DETAILED DESCRIPTION

The present inventor has recognized that the problems arising from the incompatibility of different DRM technologies can be alleviated by making digital content available in multiple DRM formats. Upon a user's request, the digital content can be provided to the user in conformance with the particular DRM format employed by the user. Accordingly, compatibility between the DRM technology employed by the content provider and the DRM technology employed by the user or client becomes less of a problem, provided that the user's DRM technology matches one of the formats used by the content provider.

Figure 1:
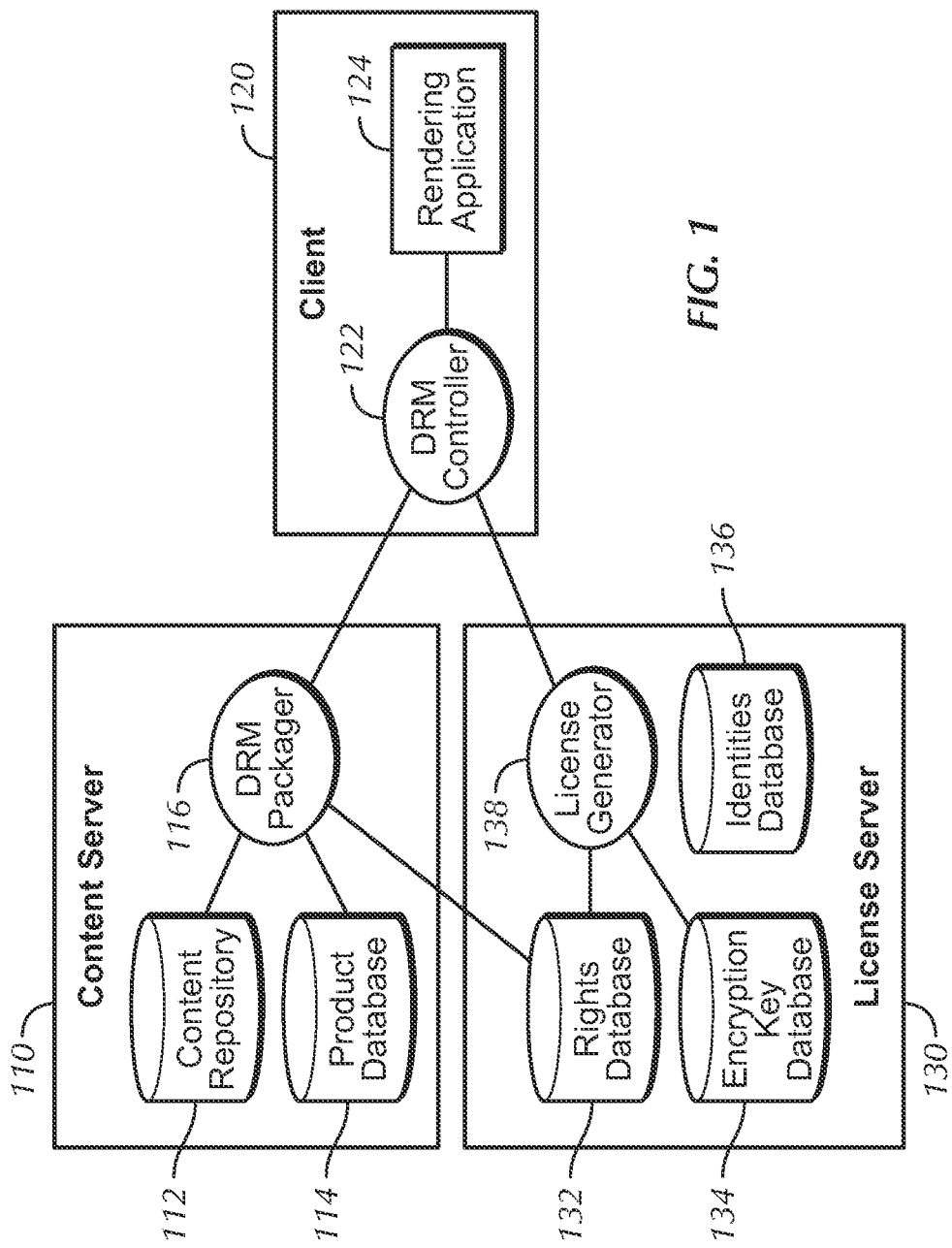
FIG. 1 shows an overview of a generalized DRM architecture that encompasses a content provider and a client.

At the outset, a high level view of a generalized DRM architecture will be presented to facilitate an understanding of the present invention. Most vendor-specific DRM implementations can be described in terms of this generalized architecture. As shown in FIG. 1, the major components of the DRM architecture are the content server 110, the license server 130, and the client 120.

Turning first to the content server 110, it includes a content repository 112 in which the actual content to be licensed is stored. The content server 110 also includes a product database 114 that stores information describing the content to be licensed, such as marketing information, catalogues, and prices. Finally, a DRM packager 116 is incorporated into the content server 110 to prepare the content for distribution. In particular, the DRM packager 116 may encrypt the content, possibly make it tamper-proof, and possibly add a watermark. The DRM packager 116 also creates a description of the rights that the content provider is willing to allow the user to exercise with respect to the content. In the simplest case the DRM packager 116 bundles the rights with the content and sends it to the user. In more flexible arrangements the content package is kept separate from the rights, with the rights being embodied in a separate license. This arrangement is particularly useful in connection with streaming media, which cannot be bundled with the content package. The DRM packager 116 may also create encryption keys to authenticate the user and decrypt the content. While in FIG. 1 the DRM packager 116 is associated with the content server 110, it should be noted that in general the content may be prepared at any point along the distribution chain. For example, DRM packager 116 may be associated with a clearinghouse that prepares content for a wide variety of different content providers.

Assuming for generality that the content package and the license are distinct, the DRM packager 116 sends the rights specification and encryption keys that it has created to the license server 130 where, in FIG. 1, they are stored in a rights database 132 and an encryption key database 134, respectively. The license server 130 may also include an identities database 136 for storing the information about the users who are entitled to exercise rights with respect to the content. A license generator 138 is employed to create the license using the information in the rights, encryption keys, and identities databases.

The client 120 refers either to the user, the device, e.g., a personal computer or PDA, or both the user and device, that is requesting the content from the content server. For the purposes of digital rights management, the primary component residing in the client 120 is the DRM controller 122, which provides the identity information to, and obtains the license from, the license server. Once the license has been obtained, the DRM controller 122 retrieves the encryption keys from the license, decrypts the content package and releases the content to a rendering application 124. The rendering application 124 is generally software residing in the client device that is used to view, play, print or otherwise exercise the rights with respect to the content. The DRM controller 122 may be software that is incorporated into the rendering application, software that is independent of the rendering application, or it even may be a dedicated hardware element. In some cases the DRM controller 122 is embodied in a plug-in for a rendering application, which is currently the case for Adobe Acrobat Reader, for example.

One example of a sequence of steps that may be used to acquire content and exercise rights with respect to that content using the architecture depicted in FIG. 1 is as follows. Generally, the user begins the process by obtaining a content package in any of a variety of ways, such as by downloading it over the Internet or reading it from physical media such as a CD-ROM. Next, the user makes a request to exercise rights on the content package. The request may be made through the rendering application 124 or some other interface, which in turn instructs the DRM controller 122 to gather the information required by the license server to generate a license. Such information generally includes identity information pertaining to the user and client device and/or information from the content package such as a content identifier. The DRM controller 122 forwards the information to the license server 130. In the license server 130, the license generator 138 authenticates the user's identity in its identities database 136 and gathers rights information from the user's license request. The license server 130 may also initiate a financial transaction with the user or, alternatively, may ensure that such a transaction has already been completed. The license generator 138 creates a license using the rights information, client identity information, and the encryption keys. The license generator 138 forwards the license to the client, which in turn decrypts the content and forwards it to the rendering application 124.

The number of vendors currently providing DRM implementations that conform to the architecture depicted in FIG. 1 is so great that for purposes of brevity only a few of them will be mentioned herein. As one example, the Media Commerce Suite is a DRM implementation available from RealNetworks that is suitable for streaming media formats such as RealAudio, RealVideo, and Windows Media. In this implementation the user downloads the Media Commerce Upgrade software, which is an add-on to a streaming media application such as RealPlayer and Windows Media Player. In terms of the FIG. 1 architecture, the Media Commerce Upgrade software serves as the DRM controller. The RealSystem License Server corresponds to license server 130 in FIG. 1 and accepts purchase requests and creates licenses for users. Another DRM implementation suitable for streaming media formats is provided by Liquid Audio, Inc. Liquid Audio supports not only Windows- and Macintosh-based client devices, but also portable devices available from vendors such as Sony, Sanyo, Palm and Toshiba. Similar to RealNetworks, Liquid Audio operates with RealAudio and Windows Media. Sony Corporation provides a variety of DRM implementations such as Open MG X, for example. Open MG X includes three distinct software modules. One module adds digital rights management information to the digital content, another module distributes the digital rights management information to the client, and a third client module is provided for developing application software that is compatible with Open MG X.

While the aforementioned DRM implementations are illustrative of those available for providing music and streaming media, other DRM implementations are designed for text- and image-based content. For example, Adobe Systems provides Adobe Content Server, which provides a DRM implementation for Adobe's own text and image application, eBook Reader. Other vendors such as InterTrust provide a DRM implementation for another text and image application provided by Adobe Systems, Acrobat Reader. InterTrust supplies a plug-in for Acrobat Reader, DocBox, which serves as the DRM controller for this implementation.

While many of the previously mentioned DRM vendors provide end-to-end DRM systems for content providers, it should be noted that not all the functional elements of such a system as depicted in FIG. 1 necessarily need to be provided by the same vendor. That is, security technology such as encryption and authentication, and technology for packaging, distributing and rendering (e.g., displaying, playing and printing) may each be provided by a different vendor. Unfortunately, as previously mentioned, if different functional elements are provided by different vendors employing various proprietary DRM technologies, the client may not be able to render the digital content in a usable manner.

To overcome this limitation, in accordance with the present invention, the DRM packager 116 prepares the content in conformity with a number of different DRM implementations. That is, the DRM packager 116 can encrypt the content and format the license so that it can be decrypted by various DRM controllers 122 that operate in accordance with different DRM implementations. In this way the client 120 is not required to have the hardware or software required by the single vendor-specific DRM implementation that is used by a given content provider.

Figure 2:
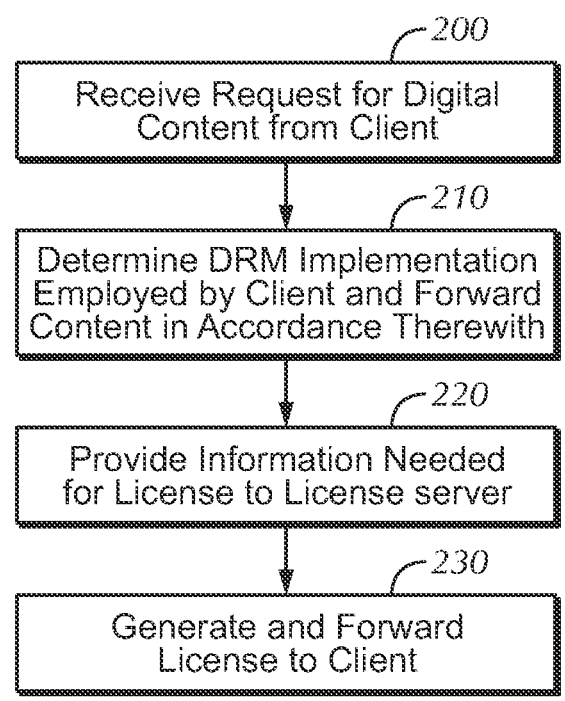
FIG. 2 is a flow-chart illustrating an exemplary sequence of steps employed by the content provider for providing digital content to a client in accordance with the present invention.

FIG. 2 is flow-chart illustrating an exemplary sequence of steps employed by the content provider for providing digital content to a client in accordance with the present invention. In step 200, the content server 110 seen in FIG. 1 receives a request from the client 120 to receive digital content. Based on information received from the client 120, the DRM packager 116 in step 210 determines the particular DRM implementation that the client employs and forwards the appropriate content package to the client in accordance with that particular DRM implementation. In step 220 the DRM packager 116 provides to the license server 130 the information necessary to generate a license. In step 230 the license server 130 generates and forwards the license to the client 120, along with any necessary encryption keys, in the format required by the client's DRM controller 122 so that the content can be decrypted and made available to the rendering application 124.

In an alternative embodiment of the invention, instead of preparing the content in conformity with different DRM implementations, the DRM packager 116 may add a layer on top of the content package prepared by the individual DRM implementations. The additional layer can access the content by a variety of means, such as with a universal key, for example, that can decrypt content from many different DRM technologies. In this way the client only needs to have a DRM controller that is compatible with this higher-level, universal DRM implementation rather than with the individual, underlying DRM implementations.

The invention claimed is:

1. A content server for storing and distributing digital content, comprising:
   a processor;
   a content database configured to electronically store the digital content; and
   a DRM packager, implemented at least in part in said processor, for adding a universal DRM layer to the digital content stored at said content database, wherein said universal DRM layer is able to access digital content in conformance with a plurality of different DRM implementations, said digital content being in conformance with one of said plurality of different DRM implementations.

2. The content server of claim 1 wherein said DRM packager is configured to encrypt the digital content based upon the universal DRM layer.

3. The content server of claim 1 wherein said DRM packager is configured to tamper-proof or watermark the digital content.

4. The content server of claim 2 wherein said DRM packager is configured to tamper-proof or watermark the digital content.

5. The content server of claim 1 wherein the DRM packager distributes the digital content over a computer network.

6. The content server of claim 5 wherein said computer network is the Internet.

7. The content server of claim 1 wherein the content database and the DRM packager are in communication over a computer network.

8. The content server of claim 7 wherein said computer network is the Internet.

9. The content server of claim 1 wherein the DRM packager further distributes a rights package to the user.

10. The content server of claim 9 wherein the rights package is bundled with the digital content.

11. The content server of claim 9 wherein the rights package includes a decryption key.

12. The content server of claim 10 wherein the rights package includes a decryption key.

13. The content server of claim 1 wherein the digital content includes text-based information.

14. The content server of claim 1 wherein the digital content includes audio information.

15. The content server of claim 1 wherein the digital content include visual information.

16. The content server of claim 1 wherein the digital content includes audio and visual information.

17. The content server of claim 1 wherein the step of transmitting the digital content includes the step of transmitting the digital content as streaming media.

18. The content server of claim 1 wherein the DRM packager is configured, in response to a request from a client to receive the digital content in conformance with a first of the plurality of different DRM implementations, to distribute the digital content together with the universal DRM layer added to the digital content.

19. A content server for storing and distributing digital content, comprising:
- a processor;
- a content database configured to electronically store the digital content; and
- a DRM packager, implemented at least in part in said processor, for distributing to a client the digital content from said content database in conformance with a universal DRM implementation that can access digital content in conformance with a plurality of different DRM implementations,
- wherein said DRM packager is configured to encrypt the digital content, to tamper-proof or watermark the digital content, and to distribute the digital content.

20. The content server of claim 19, wherein the DRM packager bundles a rights package with the digital content prior to transmitting the digital content to the client, and wherein the rights package includes a decryption key for decrypting the digital content.

* * * * *